United States Patent
Yurman et al.

(10) Patent No.: US 7,831,217 B2
(45) Date of Patent: Nov. 9, 2010

(54) METHOD AND APPARATUS TO PROVIDE DIGITAL SIGNALING WITHOUT INTERNAL MODIFICATION OF ANALOG FM TRANSCEIVER

(75) Inventors: Bruno Yurman, Lynchburg, VA (US); Eric Matthew Jamerson, Prospect, VA (US); Joshua Burke Tredway, Fayetteville, WV (US); Gregory Paul Farmer, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 549 days.

(21) Appl. No.: 11/870,305

(22) Filed: Oct. 10, 2007

(65) Prior Publication Data

US 2009/0098836 A1 Apr. 16, 2009

(51) Int. Cl.
  *H04B 1/38* (2006.01)
(52) U.S. Cl. .................. 455/90.2; 455/90.1; 455/404.1; 455/521; 370/340; 340/7.45
(58) Field of Classification Search ................ 455/90.2, 455/90.1, 404.1, 521, 501, 575.2, 63.1; 370/340; 340/7.45
See application file for complete search history.

(56) References Cited

U.S. PATENT DOCUMENTS

| | | | | |
|---|---|---|---|---|
| 4,494,244 A | * | 1/1985 | Arndt et al. ..................... 455/78 |
| 4,495,647 A | * | 1/1985 | Burke et al. ................ 340/7.57 |
| 4,517,561 A | * | 5/1985 | Burke et al. ................ 340/7.21 |
| 4,646,345 A | * | 2/1987 | Zdunek et al. ............... 455/509 |
| 4,700,375 A | * | 10/1987 | Reed ........................... 455/573 |
| 4,792,986 A | * | 12/1988 | Garner et al. ............... 455/90.2 |
| 4,815,128 A | * | 3/1989 | Malek ......................... 713/153 |
| 4,920,567 A | * | 4/1990 | Malek ........................... 380/33 |
| 5,231,355 A | * | 7/1993 | Rider et al. .................. 324/326 |
| 5,831,515 A | * | 11/1998 | Stewart et al. ........... 340/384.4 |
| 5,847,679 A | * | 12/1998 | Yee et al. ................ 342/357.07 |
| 6,466,681 B1 | * | 10/2002 | Siska et al. .................. 381/372 |
| 2006/0195261 A1 | * | 8/2006 | Riley ........................... 701/213 |
| 2008/0004089 A1 | * | 1/2008 | Huizer et al. ............. 455/575.2 |

(Continued)

OTHER PUBLICATIONS

Midian Electronics, ANI-F-VX Multi-Form ANI Encoder, Manual Revision: Jun. 20, 2007, Covers Software Revisions: ANI-F: 1.0 & Higher, 6 pgs.

(Continued)

*Primary Examiner*—Minh D Dao
(74) *Attorney, Agent, or Firm*—Fox Rothschild, LLP; Robert J. Sacco

(57) ABSTRACT

An external speaker/microphone apparatus for a radio transceiver includes a speaker, a microphone, a push-to-talk switch, and an emergency switch. The apparatus further includes an encoder module operatively coupled to the push-to-talk switch and the emergency switch and configured to generate a digital identification each time the push-to-talk switch is pressed, and a digital emergency signal and digital identification when the emergency switch is pressed. The apparatus also includes a connector configured to operatively couple audio to the speaker from the transceiver, a combination audio signal from the microphone and the encoder module to the transceiver. The connector is further configured to operatively couple the push-to-talk switch and the emergency switch to the transceiver so that the transceiver is switched to a transmit mode when either the push-to-talk switch or the emergency switch is pressed.

20 Claims, 4 Drawing Sheets

U.S. PATENT DOCUMENTS

2008/0247373 A1* 10/2008 Synnergren et al. ......... 370/340
2009/0136058 A1* 5/2009 Choi et al. .................... 381/74
2009/0203331 A1* 8/2009 Ranalli et al. .............. 455/90.2
2009/0296952 A1* 12/2009 Pantfoerder et al. ........... 381/74
2010/0111349 A1* 5/2010 Devlas et al. ............... 381/380

OTHER PUBLICATIONS

Vertex Standard Two-Way Radio VMDE-200 and VME-100 plug-in ANI boards by Cimarron Technologies, VMDE-200 Encode and Decode/Display of MDC-1200, GE Star & DTMF, Main Information page downloaded from website (http://www.frwiz.com/vertexstandard/VMDE-200_VME-100.htm) on Tuesday, Aug. 14, 2007 at 3:46 pm, 5 pgs.

CSC Control Signal, Frequently Asked Questions about the ID-12 Encoder, Downloaded from the main web page (http://www.controlsignal.com/products/id12faq.htm) on Aug. 14, 2007 at 3:18 pm, 3 pgs.

CSC Control Signal, Digital ANI: Motorola MDC-1200 Format Encoder and Decoder, Downloaded from the main web page (http://www.controlsignal.com/) on Aug. 14, 2007, at 3:13 pm, 2 pgs.

* cited by examiner

METHOD AND APPARATUS TO PROVIDE DIGITAL SIGNALING WITHOUT INTERNAL MODIFICATION OF ANALOG FM TRANSCEIVER

BACKGROUND OF THE INVENTION

This invention relates generally to a method and apparatus for land mobile radio products, and more particularly, to a method and apparatus for signaling on conventional analog FM systems or trunked analog FM systems.

Some prior art analog FM transceiver systems utilize one of two known methods to implement digital signaling (e.g., MDC-1200 signaling) on analog FM transmissions. The first of these methods uses specialized circuitry and software built into the transceiver for transmitting MDC-1200 signaling. The second of these methods uses an off-the-shelf MDC-1200 encoder module inserted within the analog-FM transceiver. Often these transceivers require modifications, changes, rework, or optional slots and positions, to accommodate the modules.

The first method uses specialized circuitry and software built into the transceiver for transmitting MDC-1200 signaling. This method can be costly and is not easily retrofitted into existing transceiver systems. In some cases, entire radio systems may have to be replaced to maintain compatibility between radios and/or base stations.

The second method uses an off-the-shelf MDC-1200 encoder module applied inside the analog-FM transceiver. Often these transceivers require modifications, changes, rework, or optional slots and positions, to accommodate the modules. Thus, these methods for implementing digital signaling can also be costly and may not be easily retrofitted into existing radios.

BRIEF DESCRIPTION OF THE INVENTION

In one embodiment of the present invention, a method is provided for sending digital signaling using an external speaker/microphone apparatus for a radio transceiver. The apparatus includes a speaker, a microphone, a push-to-talk switch, an emergency switch, an encoder module operatively coupled to the push-to-talk switch and the emergency switch, and a connector. The method includes generating a digital identification each time the push-to-talk switch is pressed, and generating a digital emergency signal and digital identification when the emergency switch is pressed.

In another embodiment of the present invention an external speaker/microphone apparatus for a radio transceiver is provided. The apparatus includes a speaker, a microphone, a push-to-talk switch, and an emergency switch. The apparatus further includes an encoder module operatively coupled to the push-to-talk switch and the emergency switch and configured to generate a digital identification each time the push-to-talk switch is pressed, and a digital emergency signal and digital identification when the emergency switch is pressed. The apparatus also includes a connector configured to operatively couple audio to the speaker from the transceiver, a combination audio signal from the microphone and the encoder module to the transceiver. The connector is further configured to operatively couple the push-to-talk switch and the emergency switch to the transceiver so that the transceiver is switched to a transmit mode when either the push-to-talk switch or the emergency switch is pressed.

DETAILED DESCRIPTION OF THE INVENTION

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Figure 1:
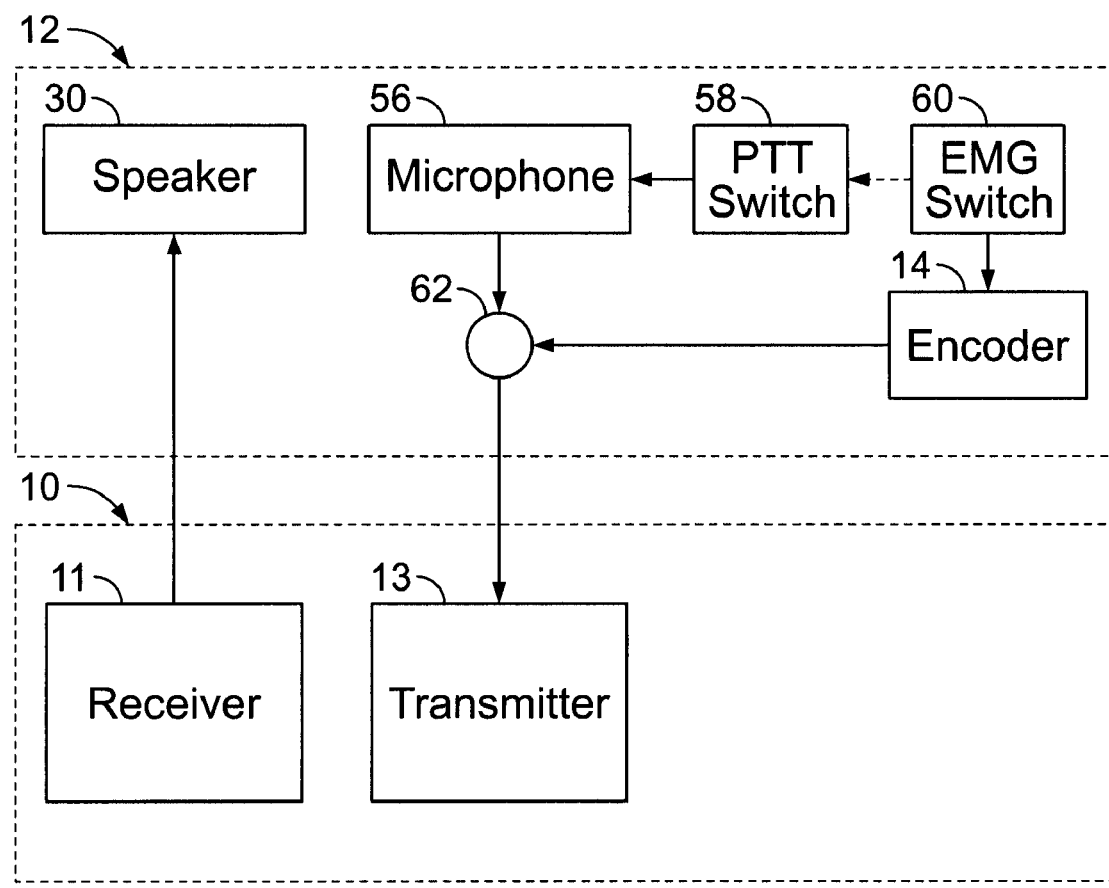
FIG. 1 is a simplified block schematic drawing of a speaker-mic constructed in accordance with an embodiment of the present invention and attached to an analog FM transceiver.

FIG. 1 is a simplified block schematic drawing of a speaker-microphone apparatus (speaker-mic) 12 constructed in accordance with an embodiment of the present invention and attached to an analog FM transceiver 10. Transceiver 10 comprises a receiver 11 and a transmitter 13. Through an external connection with an external speaker-microphone 12, hereafter speaker-mic 12, receiver 11 transfers audio to a speaker 30 within speaker-mic 12. A microphone 56, controlled by a push-to-talk (PTT) switch 58, produces audio that is sent to and modulates FM analog transmitter 13, via connector 62, when PTT switch 58 is pressed. An emergency switch 60 is also provided that activates microphone 56 (e.g., in some embodiments, by interacting with PTT switch 58). However, emergency switch 60 further activates an encoder 14 that produces a signal that also modulates transmitter 13 via the connector 62 in a manner described below. It should be noted that other switches or buttons may be configured to provide the functionality of the various embodiments of the invention.

Figure 2:
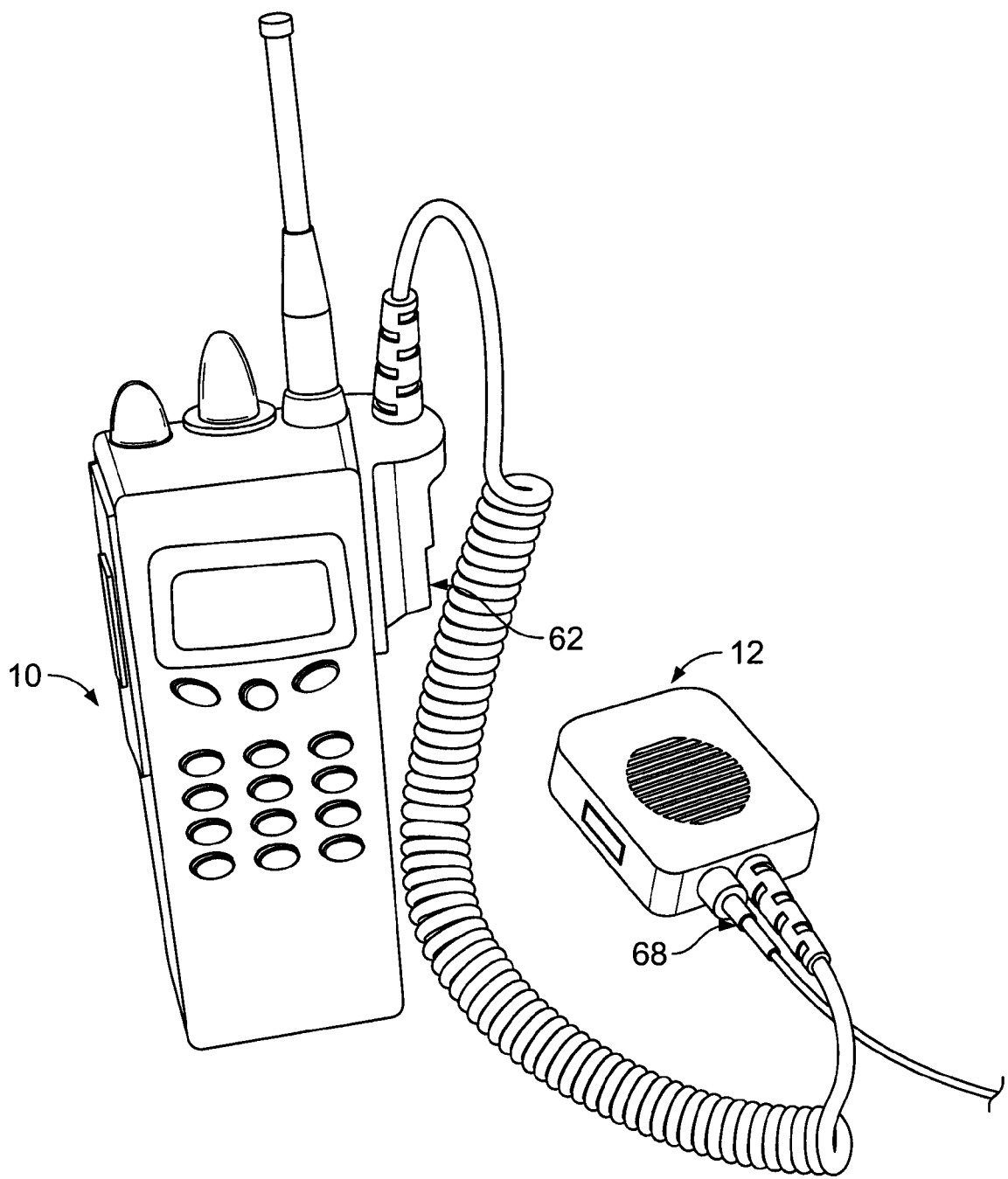
FIG. 2 is a drawing of a speaker-mic constructed in accordance with an embodiment of the present invention attached to an analog FM transceiver.

More particularly, in various embodiments of the present invention and referring to FIG. 2, an analog FM transceiver 10 is used for transmitting digital signaling information (e.g., MDC-1200 frequency shift keyed [FSK] signaling information) without requiring modification to transceiver 10. Instead, and referring to FIGS. 2 and 3, the speaker-mic apparatus 12 is used for transmit signal operations and a speaker output is used for receive signal operations. In some embodiments of the present invention, an off-the-shelf encoder module 14, such as an MDC-1200 encoder module is used. For example, encoder module 14 is encased in an otherwise standard speaker-mic 12 (an external option used for analog FM transceiver 10) to generate MDC-1200 signaling. Thus, these embodiments of the present invention do not require modifications, changes, rework, or an optional slot to implement MDC-1200 proprietary signaling on analog FM transceivers 10.

Speaker-mic 12 is configured to be compatible with typical frequency responses for the analog FM transceiver 10 through external level adjustments, whereas in at least one known prior art product in which encoder module 14 is internal to transceiver 10, compatibility was maintained using internal circuits, software, or modules together with the internal radio level adjustments. By contrast, embodiments of the present invention provide digital signaling without any need to change or modify an existing transceiver 10. What appears to transceiver 10 as a standard speaker-mic 12 option is additionally capable of digital signaling, such as MDC-1200 digital signaling, transparent to the operation and functionality of the transceiver 10 (e.g., standard FM transceiver). Hereinafter, and without loss of generality, MDC-1200 digital encoding is assumed to be used in the exemplary embodiments, even though other embodiments may use different types of encoding. Also, encoder module 14 is assumed to be an MDC-1200 encoder module in the exemplary embodiments. An off-the-shelf encoder module (e.g., CIM-1000, manufactured by Cimarron Technologies Corp.) may be used for the encoder module 14.

In some exemplary embodiments of the present invention, a standard, unmodified speaker-mic, MIA-COM P7100 speaker-mic (either with or without an antenna), can be modified for use. In some other embodiments of the present invention, an unmodified speaker-mic, MIA-COM P7100 speaker-mic, intrinsically-safe version, no antenna, vehicular charger version can be modified for use. A difference between these two microphones is that in the latter, there is no RF antenna output 16 on the speaker-mic for an antenna to attach to the speaker-mic itself. The use of an RF antenna output 16 can be advantageous when radiation from an antenna on transceiver 10 is blocked by a human body, as it is, for example, when transceiver 10 is clipped to a belt.

In various exemplary embodiments of the present invention, MDC-1200 encoding is accomplished by injecting a signal on line 18 (via line 26) from encoder module 14 directly onto the mic audio line 20 of speaker-mic 12. Microphone (mic) audio from mic audio line 20 is processed by transceiver 10 through the standard analog FM transmitter path of transceiver 10 (e.g., pre-emphasis filter, limiter, post-limiter filter), and the MDC-1200 signaling 18 is sent through this same path regardless of the type of signaling being employed.

Figure 3:
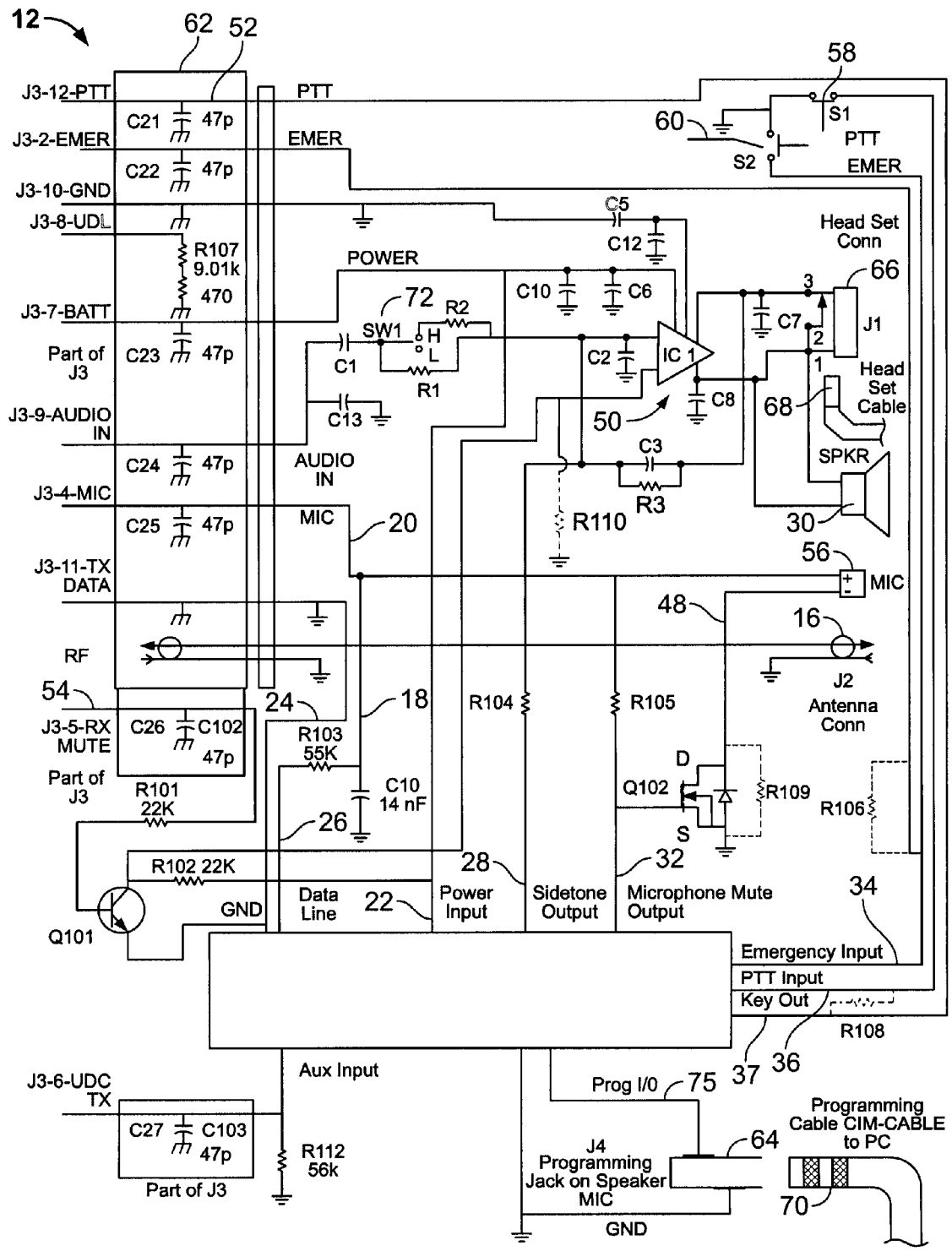
FIG. 3 is an electronic schematic drawing of the speaker-mic embodiment shown in FIG. 1.

Encoder module 14 is used in speaker-mic 12 to permit MDC-1200 signaling. The connections to encoder module 14 include: power 22 and ground 24 supply lines used to power encoder module 14; a data line 26 used to generate the MDC-1200 signaling to be coupled onto mic audio input 20; a sidetone output 28 used to generate a local sidetone to speaker 30 indicating the generation of the MDC-1200 signaling during the beginning of a transmission; a microphone mute output 32 used to mute mic audio 20 during MDC-1200 signaling and prevent voice falsing; an emergency input 34 (e.g., emergency switch 60) used for emergency automatic number identification (ANI) over the MDC-1200 signaling; push-to-talk (PTT) input 36 (e.g., PTT switch 58) used to initiate transmissions with the MDC-1200 signaling preceding the voice; and key output 37 used to generate PTT input 36 back to transceiver 10. Moreover, as shown in FIG. 3, an optional resistor R108 can be used to route PTT switch S1 input to transceiver 10 as well as encoder module 14, and to bypass the delayed routing of PTT input 36 from encoder module 14 to transceiver 10. Power input 22 to encoder module 14, is the same as the power supply to speaker-mic 12. This power supply is operated, for example, at a nominal 7.5 volts.

MDC-1200 signaling data line 26 is coupled into the mic audio path through resistor R103. Capacitor C101 performs deemphasis filtering to compensate for preemphasis filtering in transceiver 10, which is a basic radio processing on the mic audio. The values of R103 and C101 set a nominal signaling level of encoder module 14 onto mic audio path 20.

Microphone mute output 32 drives MOSFET transistor Q102 to float mic audio return line 48 during MDC-1200 signaling. The float of mic audio return line 48 disables any unintentional mic audio, which would otherwise corrupt, interfere with, and/or override the MDC-1200 signal. Resistor R105 supplies bias and is used to activate MOSFET transistor Q102 for mic voice audio when MDC-1200 signaling is not active. An optional resistor may be provided to enable mic audio at all times (e.g., provides a "hot mic"), but may affect MDC-1200 signaling if sufficient background noise is present. Further, optional circuitry located on the auxiliary input to the encoder 14 includes at least resistor R112 and can be provided to hold off MDC-1200 signaling for some transceiver applications and modes (e.g., trunking).

Sidetone output 28 is coupled into audio amplifier 50 (IC1) of speaker-mic 12 through resistor R104. The value of R104 sets the level of the nominal sidetone to the speaker. PTT input 36 is sent to encoder module 14 (as well as the PTT input 52 of transceiver 10, if an optional resistor R109 is installed), allowing transceiver 10 to start a transmission, and allowing encoder module 14 to start the MDC-1200 signaling at the beginning of each transmission from transceiver 10.

Emergency input 34 is sent to encoder module 14, allowing the MDC-1200 signaling to include emergency ID information. Non-emergency MDC-1200 signaling can include an ANI ID. Optionally, resistor R106 may be included to allow transceiver 10 to override the MDC-1200 emergency signaling with other transceiver dependent emergency signaling formats.

The specific identification of the speaker-mic 12 is changed via resistor R107 (8-UDL). Transceiver 10 reads resistor identifier R107 and enables battery power (7-BATT) to speaker-mic 12 at all times. A fixed resistor of, for example, 470 ohms is sensed by transceiver 10 for speaker-mic 12 operation. Resistor R107 enables speaker-mic power at all times, whereas without resistor R107, speaker-mic power is provided only when speaker audio is expected.

Circuitry comprising transistor Q101, resistors R101 and R102 are controlled by a speaker-mute control 54 (Rx Mute) to mute speaker amplifier 50 when all speaker audio is to be turned off. Optional resistor R110 can be used to enable audio amplifier 50 for test purposes only. Audio amplifier 50 amplifies low level audio 70 from transceiver 10 and also drives internal speaker 30 and external headset audio provided through a jack 64 or 66 (routed through a connector J1). Audio amplifier 50 is enabled via transistor Q101 and associated circuitry, and is controlled by RX MUTE line (J3-5) of transceiver 10. Mic audio from internal microphone 56 is routed directly to transceiver 10 (J3-4). Transistor Q102 and associated circuitry is capable of muting mic audio during transmissions of MDC-1200 signaling.

Switch 72 (SW1) can provide an audio gain control (high gain or low gain) by manual switching in one of two gain resistor settings (R1 or R2) in the audio path from transceiver 10 to audio amplifier 50. Coupling capacitor C1 blocks a DC component on the audio from transceiver 10. RF bypass capacitors C21-C27, C10-C13, and C3-C8 are used in the illustrated embodiment to eliminate possible RF (radio frequency) coupling into the circuits.

It should be noted that encoder module 14 is programmed via a separate programming input/output line 75, ProgI/O.

Line 75 is bidirectional (input and output) and is used in conjunction with a programming cable 70 (e.g., CIM-CABLE) that may be obtained from the supplier of encoder module 14. Programming is routed through the cable 70 via programming connector jack 64 (J4).

In some embodiments of the present invention, encoder module 14 is programmed through programming connector jack 64, which may be an earphone phono jack on speaker mic 12 (headset audio is eliminated, and a programming cable 70, which may include a phono plug, is used only for programming encoder module 14). For example, in one embodiment jack 64 may be configured as headset audio output when a head set cable 68 (which may include a stereo plug) is plugged into jack 64 and as a headset audio output when a monophonic plug 70 is plugged into jack 64. In some embodiments, however, jack 64 is configured as a programming port, and a separate audio jack 66 is provided for headset audio output.

One suitable manner in which the encoder module 14 can be programmed in speaker-mic 12 is via connection to a serial port of a personal computer. A terminal program such as "HyperTerminal" may be used. The HyperTerminal application is supplied in many versions of Microsoft Windows.

Settings that can be programmed for embodiments of the present invention include the automatic number identification (ANI) ID and the emergency (EMR) ID, which can be the same. Other settings are push to talk (PTT) sidetone, which can be set to "Y" (yes) of "N" (no). The attack time also can be changed (e.g., from 300 ms to 150 ms). Attack time generally refers to the time between (i) when a signal at the input of a device or circuit exceeds an activation threshold of the device or circuit and (ii) when that device or circuit reacts in a specified manners or to a specified degree to the input. The transmit (TX) mode additionally can be set as either conventional or trunking, as appropriate. After programming, the cable is unplugged and the radio power is cycled.

In another embodiment of the present invention, the settings applied are the same as those indicated above, except that a time-out timer (TOT) is set to 000 seconds (thereby disabling the TOT), with the attack time changed (e.g., set to 300 ms, which is the carrier attack time for the system including the radio transceiver plus repeater), and KeyFollowsPTT is set to YES, so that the key out to the transceiver follows the PTT input to encoder module 14. A separate KEY line to the transceiver can also permit MDC-1200 signaling at the end of a transmission. It should be noted that the settings may be changed to correspond to different operations or different settings may be provided to control different operations.

Speaker-mic 12 may further include microphone mute circuitry (e.g., Q102) and a mic audio return line 48, wherein microphone mute circuitry is configured to control the mic audio return line during transmission of a digital identification signal, a digital emergency signal, or both, so that mic audio does not interfere with the digital identification signal, the digital emergency signal, or both. Speaker-mic 12 may further include an antenna jack 16 mounted on the apparatus. In some embodiments of the method, a mic audio return line 48 is adjusted during transmission of a digital identification signal, a digital emergency signal, or both, so that mic audio does not interfere with the digital identification signal, the digital emergency signal, or both.

In other embodiments, software in speaker-mic 12 can be provided to initiate MDC signaling via a PTT line from the transceiver. Normally, PTT is an input to the transceiver, but PTT can be converted to an output for MDC signaling activation. Also, MDC signaling can be initiated via an emergency line from the transceiver. Normally, "emergency" is an input to the transceiver, but it can be converted to an output for MDC signaling activation. Also, the transceiver may have a UDC Tx line that can be used to enable and/or disable the MDC signaling under various conditions, e.g., trunked mode operation, priority overrides, etc.

Figure 4:
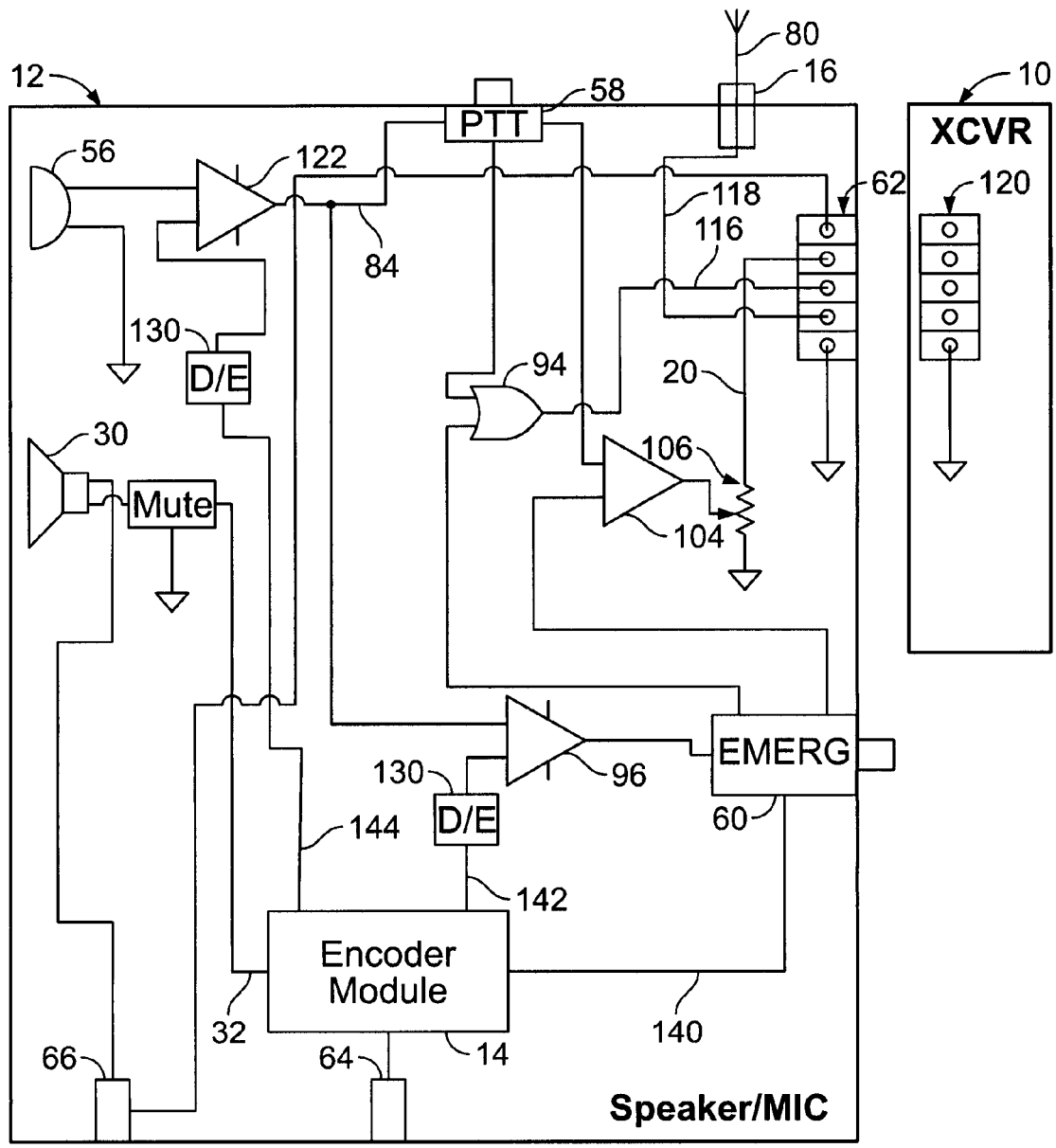
FIG. 4 is a functional block schematic drawing of a speaker-mic to illustrate functional operation in accordance with an embodiment of the present invention.

FIG. 4 is a functional block schematic drawing of speaker-mic 12 to illustrate functional operation of an exemplary embodiment of the present invention. As shown, speaker-mic 12 is an external speaker/microphone apparatus for a radio transceiver 10. Radio transceiver 10 includes a connector 120 for connection to the speaker-mic 12. Speaker-mic 12 includes speaker 30, microphone 56, push-to-talk (PTT) switch 58, and an emergency switch 60. Encoder module 14 (of any suitable type) is operatively coupled to PTT switch 58 and emergency switch 60 so that, in operation, a digital identification 144 is generated each time PTT switch 58 is pressed, and a digital emergency signal 142 is generated when emergency switch 60 is pressed. For example, encoder module 14 continuously generates digital identification signal 32 and emergency signal 142. When PTT switch 58 is pressed, audio from microphone 56 is added at audio summer 122 to digital identification signal 144 to generate an audio signal 84 that is coupled to connector 62 via PTT switch 58, summer 104, and output level controller 106. The output of output level controller 106 is a combination audio signal, which in various embodiments is the mic audio 20. When emergency switch 60 is pressed, audio signal 84 is combined with emergency signal 142 by audio summer 96 and coupled to connector 62 via emergency switch 60, audio summer 104, and output level controller 106. "Or" gate 94 serves to operatively couple PTT switch 58 and emergency switch 60 to connector 62 so that PTT output 116 is activated and transceiver 10 is switched to a transmit mode when either PTT switch 58 or emergency switch 60 is pressed.

In some embodiments of the present invention, additional features may be added to emergency switch 60. For example, emergency switch 60 may be coupled via a logic line 140 to encoder module 14 to enable only the generation of the emergency signal 142 and not the identification signal 144 when emergency switch 60 is pressed. Also, when emergency switch 60 is pressed, encoder module 14 may mute speaker 30 (and/or microphone 56, although not shown in FIG. 4) via mute output 32. Although not shown in FIG. 4, any or all of these additional features may be added to PTT switch 58 either in addition to, or instead of being added to emergency switch 60.

In some embodiments of the present invention, de-emphasis filters 130 are added in emergency signal line 142 and/or identification signal line 144. Also, an RF signal 118 from transceiver 10 is used to apply power to RF antenna output 16, such as an RF jack, on speaker-mic 12 to power an antenna 80 located thereon. Additional jacks or ports 64 and 66 are provided to program encoder module 14 and to output speaker audio, respectively.

It will be appreciated that some embodiments of the present invention provide digital signaling without requiring specialized circuitry and software built into the analog FM transceiver, and can be added to existing transceivers without altering the internal wiring of the transceiver itself.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

Accordingly, it is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description.

The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. An external speaker/microphone apparatus for a radio transceiver, said apparatus comprising:
    a speaker;
    a microphone;
    a push-to-talk switch;
    an emergency switch;
    an encoder module operatively coupled to the push-to-talk switch and the emergency switch and configured to generate a digital identification each time the push-to-talk switch is pressed, and a digital emergency signal and digital identification when the emergency switch is pressed; and
    a connector configured to operatively couple audio to the speaker from the radio transceiver, a combination audio signal from the microphone and the encoder module to the radio transceiver, and said connector further configured to operatively couple the push-to-talk switch and the emergency switch to the radio transceiver so that the radio transceiver is switched to a transmit mode when either the push-to-talk switch or the emergency switch is pressed.

2. The apparatus of claim 1 configured to inject the digital identification and the digital emergency signal into an output signal of the microphone to generate the combination audio signal.

3. The apparatus of claim 1 further comprising a level adjustment for the combination audio signal.

4. The apparatus of claim 1 further comprising a deemphasis filter for the digital identification and the digital emergency signal.

5. The apparatus of claim 1 further comprising microphone mute circuitry and a mic audio return line, and wherein the microphone mute circuitry is configured to control the mic audio return line during transmission of a digital identification signal, a digital emergency signal, or both, so that mic audio does not interfere with the digital identification signal, the digital emergency signal, or both.

6. The apparatus of claim 1 further comprising an antenna mounted on the apparatus.

7. The apparatus of claim 1 wherein the apparatus has a jack configured to provide a programming input for an external programming device to electrically program the encoder module.

8. The apparatus of claim 7 wherein the jack is configured exclusively as a programming port.

9. The apparatus of claim 7 wherein the jack is configured as a headset audio output and as a programming port, depending upon a type of plug that is plugged into the jack.

10. The apparatus of claim 9 wherein the jack is configured as headset audio output when a stereo plug is plugged into the jack and the jack is configured as a headset audio output when a monophonic plug is plugged into the jack.

11. The apparatus of claim 7 wherein the jack is configured as a programming port, and a separate audio jack is provided for headset audio output.

12. A method for sending digital signaling using an external speaker/microphone apparatus for a radio transceiver, said apparatus comprising a speaker, a microphone, a push-to-talk switch, an emergency switch, an encoder module operatively coupled to the push-to-talk switch and the emergency switch, and a connector,
    said method comprising:
        generating a first audio signal by combining a digital identification signal and audio from said microphone together each time the push-to-talk switch is pressed;
        generating a second audio signal by combining a digital emergency signal and said first audio signal together when the emergency switch is pressed; and
        selectively coupling said first or second audio signal to said radio transceiver responsive to a user input to said external speaker/microphone apparatus.

13. The method of claim 12 further comprising adjusting the level of the first or second audio signals.

14. The method of claim 12 wherein the apparatus further comprises a jack and said method further comprising electrically programming the encoder module using said jack which is plugged into an external programming port.

15. A method for sending digital signaling using an external speaker/microphone apparatus for a radio transceiver, said apparatus comprising a speaker, a microphone, a push-to-talk switch, an emergency switch, an encoder module operatively coupled to the push-to-talk switch and the emergency switch, and a connector,
    said method comprising:
        generating a digital identification each time the push-to-talk switch is pressed;
        generating a digital emergency signal and digital identification when the emergency switch is pressed; and
        injecting the digital identification and the digital emergency signal into an output signal of the microphone to generate a combination audio signal, and feeding the combination audio signal to the radio transceiver.

16. A method for sending digital signaling using an external speaker/microphone apparatus for a radio transceiver, said apparatus comprising a speaker, a microphone, a push-to-talk switch, an emergency switch, an encoder module operatively coupled to the push-to-talk switch and the emergency switch, and a connector,
    said method comprising:

generating a digital identification each time the push-to-talk switch is pressed;

generating a digital emergency signal and digital identification when the emergency switch is pressed; and deemphasizing the digital identification and the digital emergency signal to compensate for preemphasis in a transmit audio path of the radio transceiver.

17. A method for sending digital signaling using an external speaker/microphone apparatus for a radio transceiver, said apparatus comprising a speaker, a microphone, a push-to-talk switch, an emergency switch, an encoder module operatively coupled to the push-to-talk switch and the emergency switch, and a connector, said method comprising:

generating a digital identification each time the push-to-talk switch is pressed;

generating a digital emergency signal and digital identification when the emergency switch is pressed; and muting a mic audio return line during transmission of said digital identification signal, said digital emergency signal, or both, so that mic audio does not interfere with the digital identification signal, the digital emergency signal, or both.

18. A method for sending digital signaling using an external speaker/microphone apparatus for a radio transceiver, said apparatus comprising a speaker, switch, an emergency switch, an encoder module operatively coupled to the push-to-talk switch and the emergency switch, a connector and a jack, said method comprising:

generating a digital identification each time the push-to-talk switch is pressed;

generating a digital emergency signal and digital identification when the emergency switch is pressed;

electrically programming the encoder module using said jack which is plugged into an external programming port; and electrically configuring the jack as a headset audio output or as a programming port, depending upon a type of plug that is plugged into the jack.

19. The method of claim 18 wherein said electrically configuring the jack as a headset audio output or as a programming port comprises determining whether a stereo plug or a monophonic plug is plugged into the jack.

20. A method for sending digital signaling using an external speaker/microphone apparatus for a radio transceiver, said apparatus comprising a speaker, a microphone, a push-to-talk switch, an emergency switch, an encoder module operatively coupled to the push-to-talk switch and the emergency switch, a connector and a jack, said method comprising:

generating a digital identification each time the push-to-talk switch is pressed;

generating a digital emergency signal and digital identification when the emergency switch is pressed;

electrically programming the encoder module using said jack which is plugged into an external programming port; and wherein the jack is exclusively configured as a programming port, and a separate audio jack is provided for headset audio output.

* * * * *